United States Patent
Kawai et al.

(10) Patent No.: US 6,713,695 B2
(45) Date of Patent: Mar. 30, 2004

(54) RF MICROELECTROMECHANICAL SYSTEMS DEVICE

(75) Inventors: Hiroshi Kawai, Yokohama (JP); Shinji Kobayashi, Sagamihara (JP); Yoshihiro Konaka, Sagamihara (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/372,697

(22) Filed: Feb. 24, 2003

(65) Prior Publication Data

US 2003/0169146 A1 Sep. 11, 2003

(30) Foreign Application Priority Data

Mar. 6, 2002 (JP) ........................ 2002-060765

(51) Int. Cl.[7] ............................. H01P 1/10; H01H 59/00
(52) U.S. Cl. ........................................ 200/181; 333/262
(58) Field of Search ............................. 337/1, 3, 12, 13, 337/16, 36, 85, 333; 200/181; 333/258, 259, 262

(56) References Cited

U.S. PATENT DOCUMENTS

| | | | | |
|---|---|---|---|---|
| 5,367,585 A | * | 11/1994 | Ghezzo et al. | 385/23 |
| 5,479,042 A | * | 12/1995 | James et al. | 257/415 |
| 5,544,001 A | * | 8/1996 | Ichiya et al. | 361/233 |
| 5,619,061 A | * | 4/1997 | Goldsmith et al. | 257/528 |
| 5,959,338 A | * | 9/1999 | Youngner et al. | 257/419 |
| 6,133,807 A | * | 10/2000 | Akiyama et al. | 333/101 |
| 6,153,839 A | | 11/2000 | Zavracky et al. | |
| 6,160,230 A | * | 12/2000 | McMillan et al. | 200/181 |
| 6,307,452 B1 | * | 10/2001 | Sun | 333/262 |
| 6,366,186 B1 | * | 4/2002 | Hill et al. | 335/78 |
| 6,426,687 B1 | * | 7/2002 | Osborn | 333/262 |
| 6,440,767 B1 | * | 8/2002 | Loo et al. | 438/52 |
| 6,472,962 B1 | * | 10/2002 | Guo et al. | 333/262 |
| 6,535,091 B2 | * | 3/2003 | Bechtle et al. | 333/262 |
| 6,621,387 B1 | * | 9/2003 | Hopcroft | 333/262 |
| 2002/0075094 A1 | * | 6/2002 | Bechtle et al. | 333/105 |
| 2002/0096421 A1 | * | 7/2002 | Cohn et al. | 200/181 |
| 2002/0124385 A1 | | 9/2002 | Tsai et al. | |
| 2003/0047799 A1 | * | 3/2003 | Cheever et al. | 257/686 |

FOREIGN PATENT DOCUMENTS

| | | | |
|---|---|---|---|
| EP | 892419 A2 | * 1/1999 | ......... H01H/59/00 |
| EP | 1 093 142 A2 | 4/2001 | |
| EP | 1 150 318 A1 | 10/2001 | |
| JP | 2000-188050 | 7/2000 | |

OTHER PUBLICATIONS

Jae Y. Park et al.: "Electroplated RF MEMS Capacitive Switches"; MEMS 2000; Jan. 23, 2000; pp. 639–644; Japan.

* cited by examiner

Primary Examiner—Anatoly Vortman
(74) Attorney, Agent, or Firm—Keating & Bennett, LLP (57) ABSTRACT

An RF-MEMS device includes a substrate, a coplanar line arranged on the substrate, a movable element disposed above the coplanar line, and a movable electrode arranged on the movable element so as to face the coplanar line. The movable element includes a high-resistivity semiconductor functioning as an insulator for an RF signal and functioning as an electrode for a low-frequency signal and a DC signal. Electrostatic attraction caused by a DC voltage applied between the movable element functioning as the electrode and a fixed electrode displaces the movable element towards the fixed electrode, thereby varying the capacitance between the movable electrode and the coplanar line. The movable element made of a high-resistivity semiconductor has dielectric loss characteristics in which the dielectric loss decreases as the frequency of a signal increases, thus readily reducing the dielectric loss of an RF signal.

20 Claims, 9 Drawing Sheets

RF MICROELECTROMECHANICAL SYSTEMS DEVICE

BACKGROUND OF THE INVENTION

1. Field of the Invention

The present invention relates to RF microelectromechanical systems (MEMS) devices for use in, for example, RF circuits.

2. Description of the Related Art

Figure 9A:
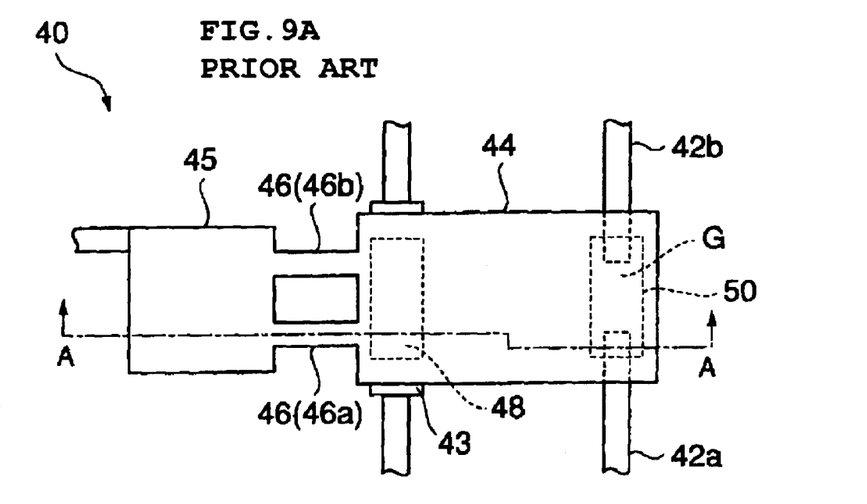
FIG. 9A is a plan view of a micro-machine switch disclosed in Japanese Patent No. 3119255.
Figure 9B:
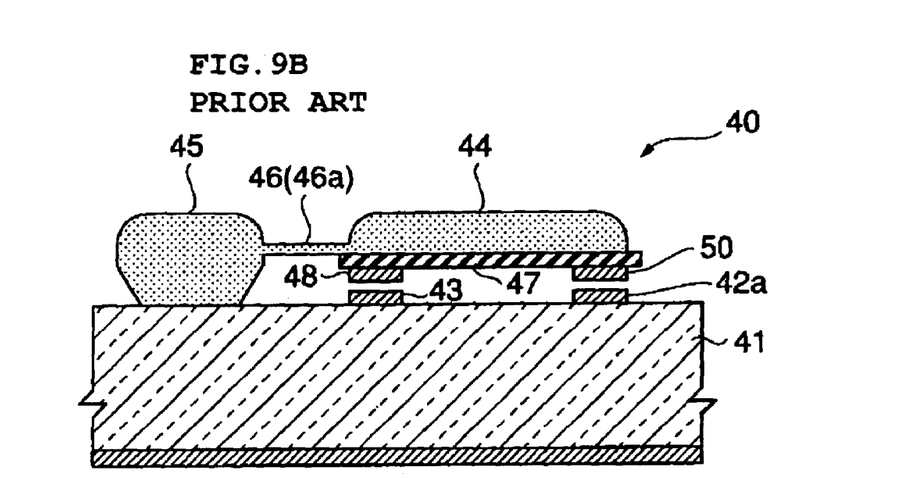
FIG. 9B is a sectional view of the micro-machine switch taken along line A—A in FIG. 9A.

FIG. 9A is a plan view of a micro-machine switch 40. FIG. 9B is a sectional view of the micro-machine switch 40 taken along line A—A in FIG. 9A (refer to Japanese Patent No. 3119255). In the micro-machine switch 40, a first signal line 42a and a second signal line 42b are arranged on a substrate 41. One end of each of the first signal line 42a and the second signal line 42b face each other, with a gap G therebetween. A bottom electrode 43 is arranged on the substrate 41 and is separated from the first signal line 42a and the second signal line 42b.

A fixing unit 45 is arranged near the bottom electrode 43 on the substrate 41. A movable element 44 is arranged above the substrate 41. The movable element 44 faces, with a space therebetween, an area of the substrate covering the area extending from the one end of the first signal line 42a and the one end of the second signal line 42b to the bottom electrode 43. The movable element 44 is supported by the fixing unit 45 and beams 46 (46a and 46b).

An insulating film 47 is arranged on substantially the entire surface of the movable element 44 at the substrate side. A movable electrode 48 and a contact electrode 50 are arranged on the insulating film 47. The movable electrode 48 faces the bottom electrode 43 and the contact electrode 50 faces an area extending from the one end of the first signal line 42a to the one end of the second signal line 42b, with the gap G therebetween.

In the micro-machine switch 40 having the arrangement described above, for example, a DC voltage applied between the bottom electrode 43 and the movable electrode 48 causes electrostatic attraction to occur between the bottom electrode 43 and the movable electrode 48. This electrostatic attraction causes the beams 46a and 46b to be bent, thereby allowing the movable element 44 to be attracted towards the substrate 41. The displacement of the movable element 44 causes contact between the contact electrode 50 and the one end of the first signal line 42a and the one end of the second signal line 42b, and therefore the contact electrode 50 connects the first signal line 42a and the second signal line 42b. The contact between the contact electrode 50 and the first signal line 42a and the second signal line 42b causes signal conduction of the first signal line 42a and the second signal line 42b to be switched on. In contrast, removing the contact electrode 50 from the first signal line 42a and the second signal line 42b causes the signal conduction of the first signal line 42a and the second signal line 42b to be switched off. That is to say, the micro-machine switch 40 performs a switching operation, as described above.

In the arrangement of the micro-machine switch 40 described above, the movable element 44 is made of low-resistivity silicon which is heavily doped with boron. Since the low-resistivity silicon has large a dielectric loss, an RF signal made to flow in the contact electrode 50 by the switch-on operation disadvantageously experiences large propagation loss.

SUMMARY OF THE INVENTION

In order to overcome the problems described above, preferred embodiments of the present invention provide an RF-MEMS device that effectively minimizes propagation loss of an RF signal.

According to a first preferred embodiment of the present invention, an RF-MEMS device includes a substrate, an RF signal-conducting unit disposed on the substrate, a movable element arranged above the substrate with a space therebetween and facing at least part of the RF signal-conducting unit with a space therebetween, a movable electrode arranged on the movable element and facing at least part of the RF signal-conducting unit, and a fixed electrode arranged on the substrate and facing at least part of the movable element. The movable element includes a high-resistivity semiconductor functioning as an insulator for an RF signal and functioning as an electrode for a low-frequency signal and a DC signal. The fixed electrode and the movable element functioning as the electrode together function as a movable element displacing unit for displacing the movable element towards the fixed electrode by electrostatic attraction caused by a DC voltage applied between the fixed electrode and the movable element. The movable element displacing unit displaces the movable element towards or away from the substrate due to the electrostatic attraction. The displacement of the movable element by the movable element displacing unit changes the space between the RF signal-conducting unit and the movable electrode, thereby varying the capacitance between the RF signal-conducting unit and the movable electrode.

An RF-MEMS device according to a second preferred embodiment of the present invention includes a substrate, an RF signal-conducting unit disposed on the substrate, a movable element arranged above the substrate with a space therebetween and facing at least part of the RF signal-conducting unit with a space therebetween, a movable electrode arranged on the movable element and facing the RF signal-conducting unit, an upper member facing at least part of the top of the movable element with a space therebetween, and a fixed electrode arranged on the upper member to face at least part of the movable element. The movable element includes a high-resistivity semiconductor functioning as an insulator for an RF signal and functioning as an electrode for a low-frequency signal and a DC signal. The fixed electrode and the movable element functioning as the electrode together function as a movable element displacing unit for displacing the movable element towards the fixed electrode by electrostatic attraction caused by a DC voltage applied between the fixed electrode and the movable element. The movable element displacing unit displaces the movable element towards or away from the substrate due to the electrostatic attraction. The displacement of the movable element by the movable element displacing unit changes the space between the RF signal-conducting unit and the movable electrode, thereby varying the capacitance between the RF signal-conducting unit and the movable electrode.

Preferably, the RF-MEMS device further includes a protective insulating film provided on at least one of a surface of the RF signal-conducting unit and a surface of the movable electrode, the surface of the RF signal-conducting unit being disposed opposite to the surface of the movable electrode.

Preferably, an RF signal with a frequency of about 5 GHz or more flows in the RF signal-conducting unit.

Preferably, the high-resistivity semiconductor functioning as the movable element has a resistance ranging from about 1,000 Ωcm to about 10,000 Ωcm.

The RF-MEMS device may be a variable capacitor defined by the RF signal-conducting unit and the movable electrode and the capacitance of the variable capacitor varies by displacement of the movable element.

The RF signal-conducting unit may be a coplanar line. The RF-MEMS device may be a switching device in which an increased capacitance between the coplanar line and the movable electrode causes an RF short circuit between the coplanar line and the movable electrode, thereby switching off the conduction of the coplanar line, and in which a decreased capacitance between the coplanar line and the movable electrode causes an RF-open circuit between the coplanar line and the movable electrode, thereby switching on the conduction of the coplanar line.

The RF signal-conducting unit may include divided signal lines which are divided by an intermediate gap provided in an area that faces the movable electrode, and one end of each of the divided signal lines at each side of the intermediate gap faces the movable electrode with a space therebetween. The RF-MEMS device may be a switching device in which an increased capacitance between the movable electrode and the one end of each of the divided signal lines at each side of the intermediate gap causes an RF short circuit between the movable electrode and the one end of each of the divided signal lines at each side of the intermediate gap, thereby switching on the conduction of the one end of each of the divided signal lines at each side of the intermediate gap by the movable electrode, and in which a decreased capacitance between the movable electrode and the one end of each of the divided signal lines at each side of the intermediate gap causes an open circuit between the movable electrode and the one end of each of the signal lines at each side of the intermediate gap, thereby switching off the conduction of the signal in the divided signal lines.

According to various preferred embodiments of the present invention, the movable element is preferably made of a high-resistivity semiconductor. Thus, the movable element can function as an electrode for a low-frequency signal and a DC signal. Accordingly, the movable element itself functions as an electrode of the movable element displacing unit. Therefore, it is unnecessary to provide an electrode on the movable element for the movable element displacing unit, thus simplifying the structure and manufacturing process of the RF-MEMS device.

As described above, the movable element is preferably made of a high-resistivity semiconductor which has very low dielectric loss characteristics for an RF signal. Thus, the signal loss is greatly reduced and minimized.

If an insulating film is arranged on at least one of a surface of the RF signal-conducting unit and a surface of the movable electrode, which face each other, the RF signal-conducting unit or the movable electrode can be protected. Since the RF signal-conducting unit and the movable electrode are not in contact with each other, prevention of signal loss due to contact resistance caused by contact between the RF signal-conducting unit and the movable electrode can be ensured.

If an RF signal with a frequency of approximately 5 GHz or more flows in the RF signal-conducting unit, the dielectric loss can be significantly reduced by the movable element composed of a high-resistivity semiconductor.

The RF-MEMS device which is a switching device having the characteristic features of preferred embodiments of the present invention or the RF-MEMS device which is a variable capacitor in a circuit enables a reduction in loss in the circuit.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described with reference to the drawings.

Figure 1A:
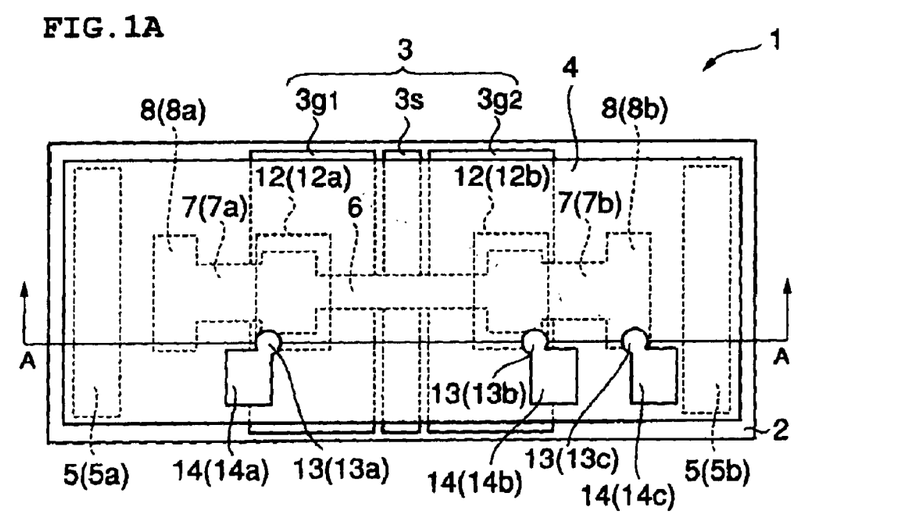
FIG. 1A is a schematic plan view showing an RF-MEMS device according to a first preferred embodiment of the present invention.
Figure 1B:
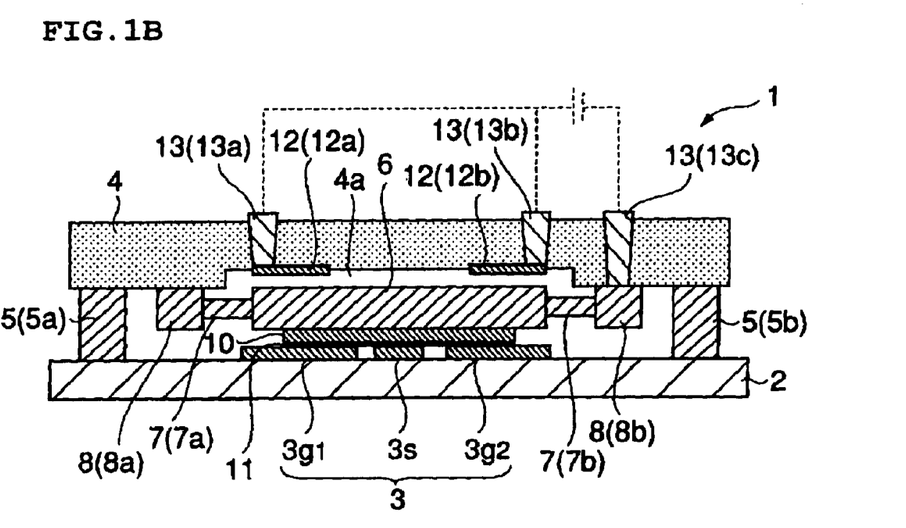
FIG. 1B is a schematic sectional view showing the RF-MEMS device taken along line AA in FIG. 1A.

FIG. 1A is a schematic plan view showing an RF-MEMS device 1 according to a preferred embodiment of the present invention. FIG. 1B is a schematic sectional view showing the RF-MEMS device 1 taken along line A—A in FIG. 1A.

The RF-MEMS device 1 according to a first preferred embodiment of the present invention is assembled in an RF circuit and functions as a switching device for a coplanar line. The RF-MEMS device 1 includes a substrate 2 (for example, a silicon substrate or a sapphire substrate, or other suitable material substrate). A coplanar line (coplanar waveguide (CPW) line) 3, which is an RF signal-conducting path, is arranged on the substrate 2. The coplanar line 3 is a line for transmission of the RF signal and includes a signal line $3s$ and two ground lines $3g1$ and $3g2$. The signal line $3s$ is positioned between the ground lines $3g1$ and $3g2$ but is not in contact with them. The signal line $3s$ and the ground lines $3g1$ and $3g2$ are, for example, conducting films which are preferably made of gold (Au) or other suitable material. The thickness of the signal line 3s and the ground lines 3g1 and 3g2 is set appropriately. For example, the thickness is approximately 2 μm. In the first preferred embodiment, for example, an RF signal of about 5 GHz or more flows in the coplanar line 3.

An upper member (for example, a glass substrate) 4 is arranged above the substrate 2, with a space therebetween. The upper member 4 is fixed above the substrate 2 with fixing units 5 (5a and 5b).

A movable element 6 is arranged between the substrate 2 and the upper member 4. The movable element 6 is separated from the top of the coplanar line 3 and faces parts of the signal line 3s and the ground lines 3g1 and 3g2 of the coplanar line 3. The movable element 6 is held by the upper member 4 with beams 7 (7a and 7b) and holders 8 (8a and 8b) therebetween so that the movable element 6 can be displaced towards or away from the substrate 2.

Figure 2A:
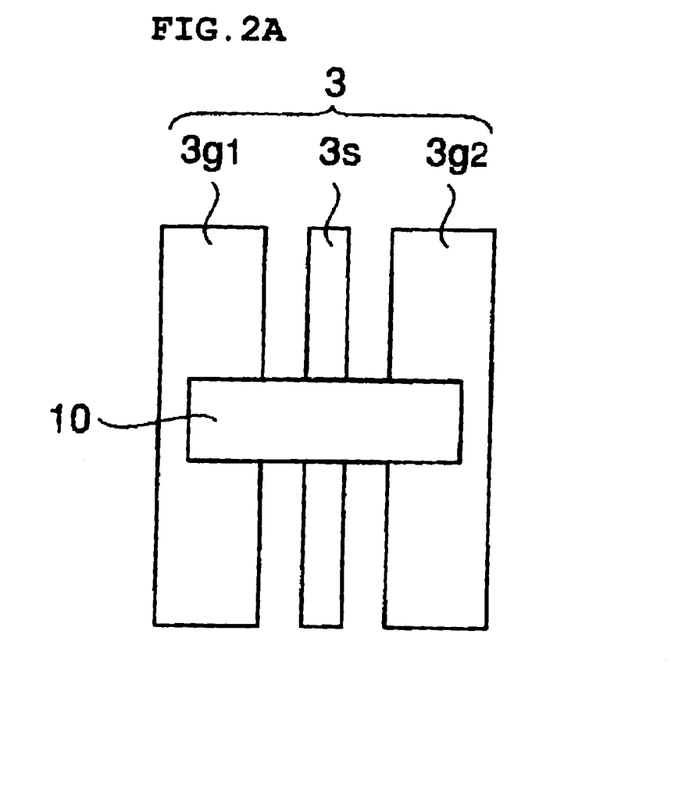
FIGS. 2A and 2B are model diagrams for explaining an example of the relationship between a movable electrode and a coplanar line constituting the RF-MEMS device according to the first preferred embodiment of the present invention.
Figure 2B:
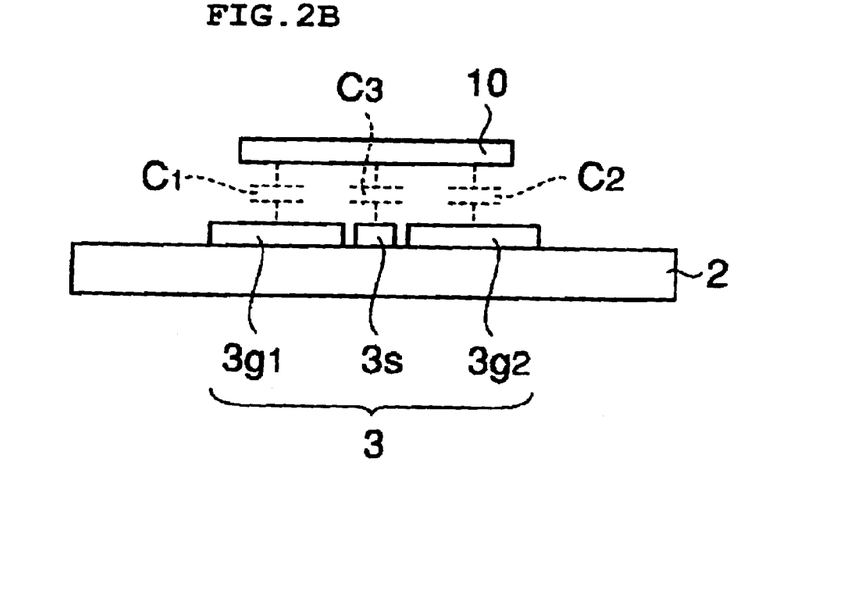

A movable electrode 10 which is preferably formed of a conducting film of gold (Au) or other suitable material is arranged on the substrate-side surface of the movable element 6. FIG. 2A is a simplified illustration showing the relationship between the movable electrode 10 and the coplanar line 3 when viewed from the upper member 4. FIG. 2B is a simplified illustration showing the relationship between the movable electrode 10 and the coplanar line 3 when viewed from the side. As shown in FIGS. 2A and 2B, the movable electrode 10 separated from and facing the signal line 3s and the ground lines 3g1 and 3g2 is arranged so as to cross the ground line 3g1, the signal line 3s, and the ground line 3g2.

In the first preferred embodiment, a protective insulating film 11 is arranged on the surface of the movable electrode 10. The insulating film 11 is made, for example, of a very thin insulating material such as silicon nitride (SiN) or other suitable material. The insulating film 11 has a thickness of, for example, approximately 0.1 μm.

The upper member 4 has a recess 4a in a portion which faces the movable element 6, and fixed electrodes 12 (12a and 12b) which face the movable element 6 are provided on the internal surface of the recess 4a. Through holes 13a, 13b, and 13c are arranged in the surface of the upper member 4. The through holes 13a and 13b extend from the surface of the upper member 4 to the fixed electrodes 12a and 12b. The through hole 13c extends from the surface of the upper member 4 to the holder 8b. Electrode pads 14a, 14b, and 14c are arranged on the surface of the upper member 4 and are connected to the through holes 13a, 13b, and 13c, respectively.

One of the unique characteristics of the first preferred embodiment is that the movable element 6 is a high-resistivity semiconductor. The high-resistivity semiconductor functions as an insulator for the RF signal (for example, a signal of approximately 5 GHz or more) and functions as an electrode for a low-frequency signal (for example, a signal of approximately 100 kHz or less) and a DC signal. In the first preferred embodiment, the high-resistivity semiconductor functioning as the movable element 6 has a resistance ranging from about 1,000 Ωcm to about 10,000 Ωcm, for example.

Figure 5:
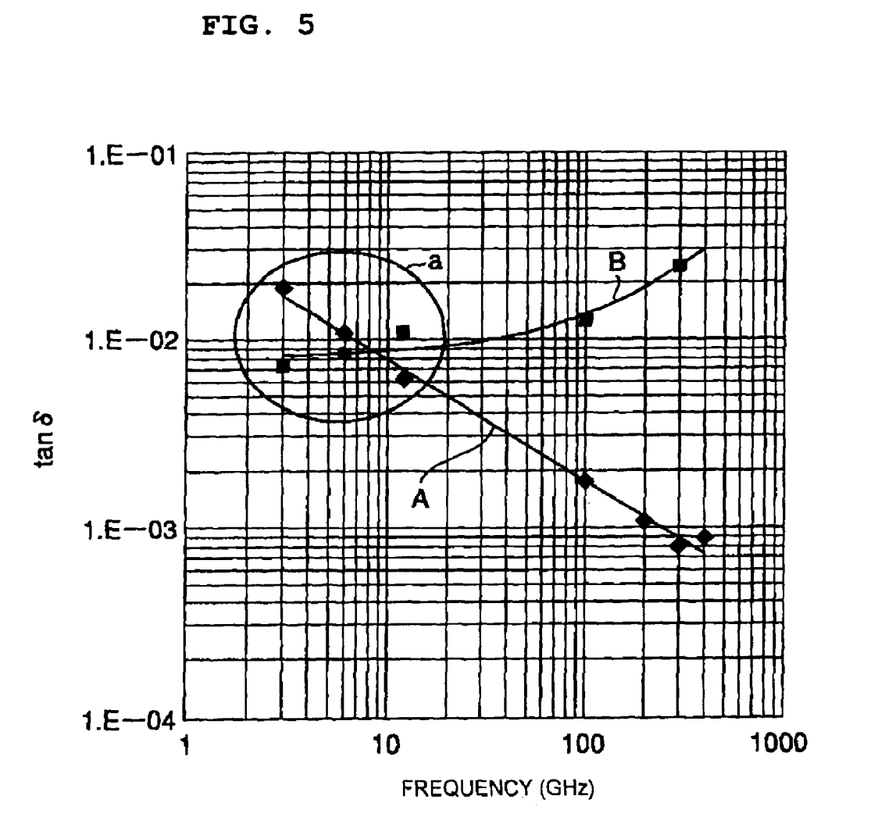
FIG. 5 is a graph showing the relationship between the frequency and dielectric loss (tan δ) of a high-resistivity semiconductor and the relationship between the frequency and dielectric loss (tan δ) of glass.

The high-resistivity semiconductor has the following dielectric loss characteristics. As shown by the solid line B in FIG. 5, the higher the frequency, the larger the dielectric loss (tan δ) of an insulator made of glass or other suitable material. In contrast, as shown by the solid line A in FIG. 5, the higher the frequency, the smaller the dielectric loss of a high-resistivity semiconductor. In FIG. 5, the solid line A represents the dielectric loss of high-resistivity silicon having a resistance of approximately 2,000 Ωcm. Values in an area encircled by the solid line a are experimental values and the others are reference values. The values represented by the solid line B are reference values for Pyrex (registered trademark) glass.

In the first preferred embodiment, an RF signal of about 5 GHz or more flows in the coplanar line 3, and the dielectric loss characteristics with respect to the RF signal of the movable element 6 made of the high-resistivity semiconductor is equivalent to or superior to that of a movable element made of an insulator.

Figure 4:
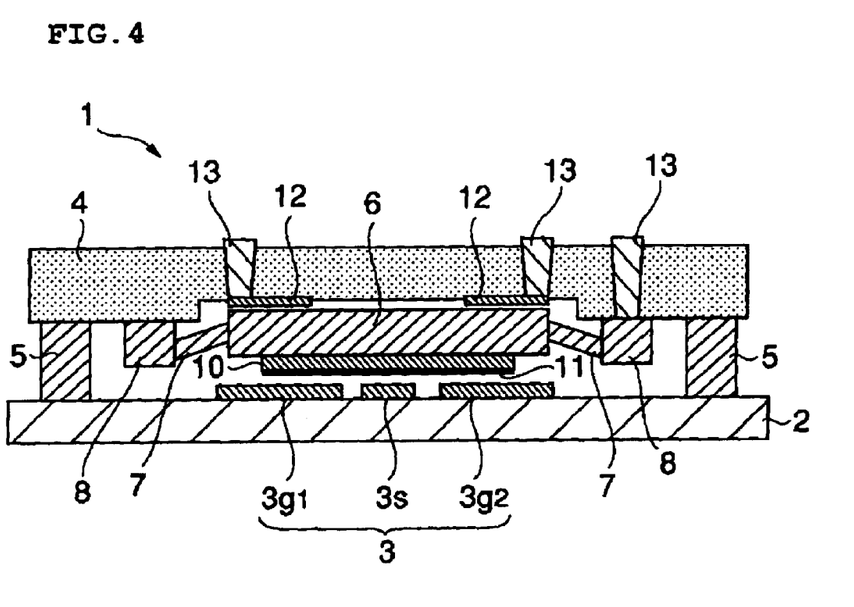
FIG. 4 is a model diagram showing a state in which the movable element is displaced by electrostatic attraction in the RF-MEMS device according to the first preferred embodiment of the present invention.

As described above, in the first preferred embodiment, the movable element 6 made of the high-resistivity semiconductor functions as the electrode for the DC signal (DC voltage). Thus, the movable element 6, functioning as the electrode, and the fixed electrodes 12a and 12b function as a movable element displacing unit for displacing the movable element 6. More specifically, applying an external DC voltage (for example, approximately 5 V) between the movable element 6 and the fixed electrodes 12 (12a and 12b) via the electrode pads 14a, 14b, and 14c and the through holes 13a, 13b, and 13c causes electrostatic attraction between the movable element 6 and the fixed electrodes 12. As shown in FIG. 4, the movable element 6 is attracted towards the fixed electrodes 12 by this electrostatic attraction. Accordingly, the electrostatic attraction caused between the movable element 6 and the fixed electrodes 12 displaces the movable element 6.

The RF-MEMS device 1 according to the first preferred embodiment arranged as described above functions as a switching device for the coplanar line, as described below.

For example, when the insulating film 11 on the movable electrode 10 is in contact with or is close to the coplanar line 3, as shown in FIG. 1B, the space between the movable electrode 10 and the coplanar line 3 is very small and the thickness of the space is substantially the same as the thickness of the insulating film 11 (for example, about 0.1 μm), thus increasing the capacitance between the movable electrode 10 and the coplanar line 3.

Figure 3A:
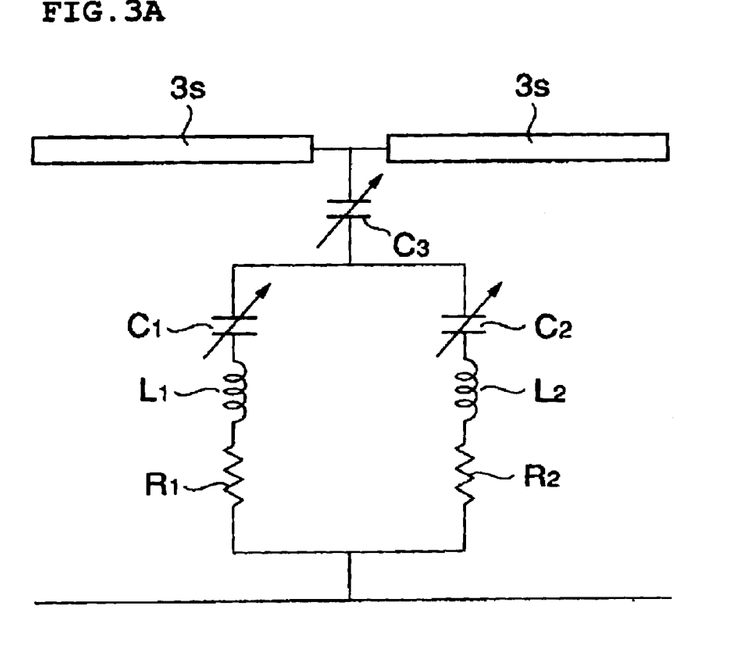
FIGS. 3A and 3B are equivalent circuit diagrams of the movable electrode and the coplanar line constituting the RF-MEMS device according to the first preferred embodiment of the present invention.

FIG. 3A is an equivalent circuit diagram of the movable electrode 10 and the coplanar line 3 shown in FIGS. 2A and 2B. $C_1$ represents the capacitance between the movable electrode 10 and the ground line 3g1, $C_2$ represents the capacitance between the movable electrode 10 and the ground line 3g2, and $C_3$ represents the capacitance between the movable electrode 10 and the signal line 3s. $L_1$ and $R_1$ represent the inductance and resistance of the movable electrode 10 at the ground line 3g1 side, respectively. $L_2$ and $R_2$ represent the inductance and resistance of the movable electrode 10 at the ground line 3g2 side, respectively.

Figure 3B:
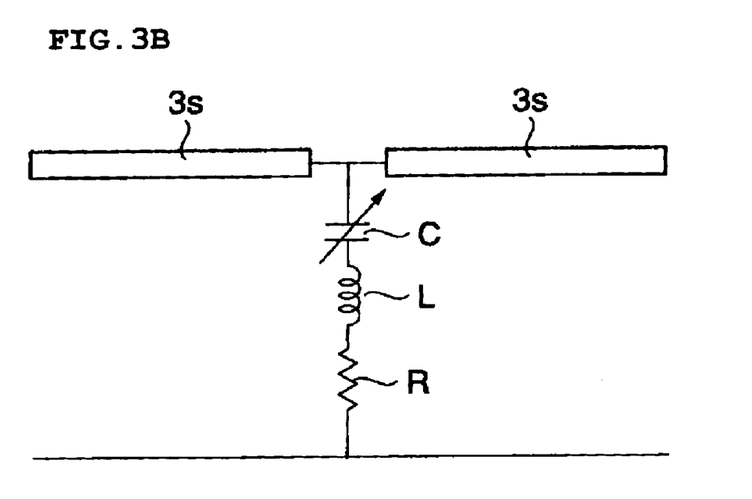

The equivalent circuit shown in FIG. 3A can be represented as shown in FIG. 3B. The capacitance C is substantially based on the equation, $C=1/((1/(C_1+C_2))+(1/C_3))$, the inductance L is substantially based on the equation, $L=1/((1/L_1)+(1/L_2))$, and the resistance R is substantially based on the equation, $R=1/((1/R_1)+(1/R_2))$.

As described above, the increase in the capacitance C between the movable electrode 10 and the coplanar line 3 due to the small space between the movable electrode 10 and the coplanar line 3 causes the series LC resonant frequency in the equivalent circuit shown in FIG. 3B to become close to the frequency of the RF signal flowing in the signal line 3s, thereby significantly reducing the impedance of the LC circuit when viewing the ground side from the signal line 3s side through the movable electrode 10. In other words, a state equivalent to a short circuit occurs when viewing the ground side from the signal line 3s side through the movable electrode 10. Accordingly, the signal conduction of the coplanar line 3 is switched off.

Referring to FIG. 4, displacement of the movable element 6 away from the substrate 2 and an increase in the space between the movable electrode 10 and the coplanar line 3, for example, up to approximately 5 μm causes a decrease in the capacitance C between the movable electrode 10 and the coplanar line 3, thereby significantly increasing the impedance when viewing the ground side from the signal line 3s side through the movable electrode 10. In other words, a state equivalent to an open circuit occurs when viewing the ground side from the signal line 3s side through the movable electrode 10. Accordingly, the signal conduction of the coplanar line 3 is switched on.

As described above, the RF-MEMS device 1 according to the first preferred embodiment can switch on or off the signal conduction of the coplanar line 3 by the displacement of the movable element 6 due to the electrostatic attraction.

In the first preferred embodiment, the movable element 6 is preferably made of the high-resistivity semiconductor. Thus, the movable element 6 itself can function as an electrode in the movable element displacing unit, as described above. With this function, there is no need to provide an electrode on the movable element 6 for the movable element displacing unit, thereby simplifying the structure and the manufacturing process of the RF-MEMS device 1. Consequently, the cost of the RF-MEMS device 1 can be reduced.

Also, the movable element 6 made of the high-resistivity semiconductor functions as an insulator for the RF signal, and the dielectric loss (tan δ) of the movable element 6 is substantially equal to or less than that of the insulator, thus reducing the propagation loss of the RF signal. In recent years, the frequency of signals flowing in RF circuits has been higher. Increased dielectric loss of the movable element made of the insulator in the higher frequency range (refer to the solid line B in FIG. 5) disadvantageously increases the propagation loss of the signal by the movable element. In contrast, since the movable element 6 according to the first preferred embodiment is made of the high-resistivity semiconductor, the higher the frequency of the signal, the smaller the dielectric loss of the movable element 6 (refer to the solid line A in FIG. 5). Thus, the propagation loss of the signal by the movable element 6 is greatly reduced by increasing the frequency of the signal. Accordingly, the arrangement according to the first preferred embodiment will become very effective in the future.

For example, if the coplanar line 3 and the movable electrode 10 are directly contacted to each other, the resistance R in FIG. 3B increases by a contact resistance component added to the resistance R, thereby increasing the signal loss. In contrast, in the first preferred embodiment, the coplanar line 3 and the movable electrode 10 are coupled to each other with the capacitance therebetween. Thus, contact resistance does not occur between the coplanar line 3 and the movable electrode 10, thereby preventing and minimizing the signal loss.

A second preferred embodiment of the present invention will now be described. In the description of the second preferred embodiment, the same elements as in the first preferred embodiment are referred to with the same reference numerals and the descriptions of those same parts will not be repeated here.

Figure 6:
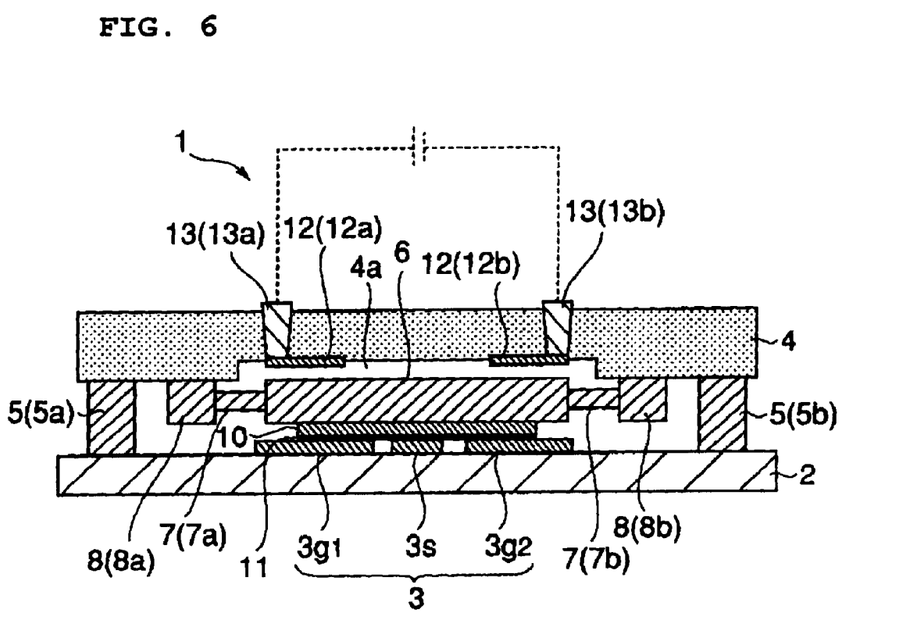
FIG. 6 is a model diagram for explaining an RF-MEMS device according to a second preferred embodiment of the present invention.

Referring to FIG. 6, the RF-MEMS device 1 according to the second preferred embodiment preferably has the same arrangement as in the first preferred embodiment with the exception that the movable element 6 is electrically floating. More specifically, the through hole 13c and the electrode pad 14c (see FIGS. 1A and 1B) for allowing the movable element 6 to be conductively connected to the outside thereof are omitted in the second preferred embodiment. Accordingly, a much simpler structure can be achieved in the second preferred embodiment as compared to the structure according to the first preferred embodiment. Also, the manufacturing cost of the RF-MEMS device 1 can be reduced.

A third preferred embodiment of the present invention will now be described. In the description of the third preferred embodiment, the same elements as in the first and second preferred embodiments are referred to with the same reference numerals and the descriptions of those same elements will not be repeated here.

Figure 7:
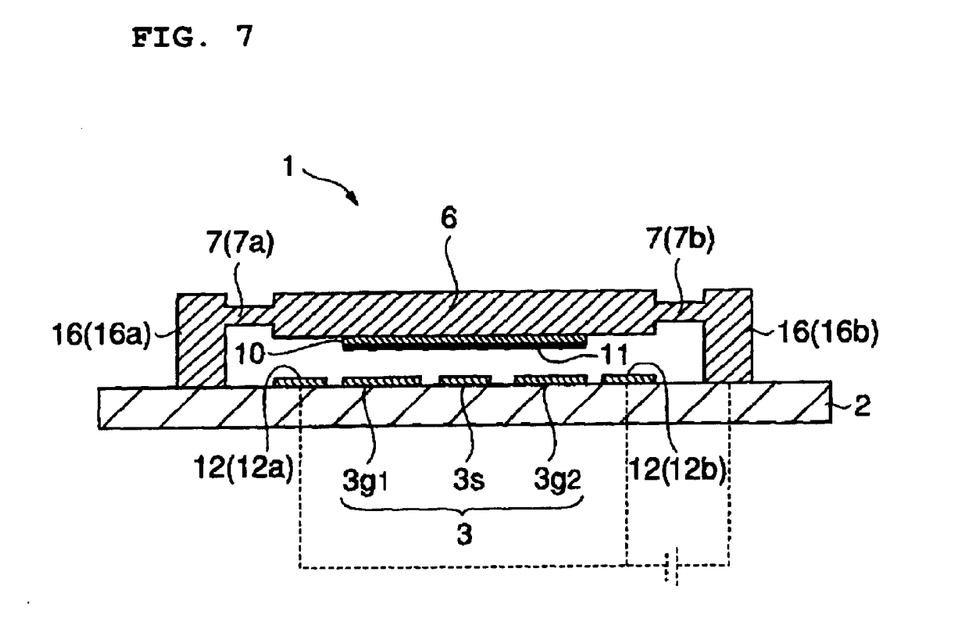
FIG. 7 is a model diagram for explaining an RF-MEMS device according to a third preferred embodiment of the present invention.

In the third preferred embodiment, as shown in FIG. 7, the fixed electrodes 12 (12a and 12b) are arranged below the movable element 6. In other words, they are arranged on the substrate 2 to face part of the movable element 6. The upper member 4 (see FIGS. 1B and 6) is omitted in the third preferred embodiment, unlike the first and second preferred embodiments in which the upper member 4 is provided in order to dispose the fixed electrodes 12 above the movable element 6. In the third preferred embodiment, fixing units 16 (16a and 16b) fixed on the substrate 2 fix the movable element 6 by the beams 7 (7a and 7b) arranged between the movable element 6 and the fixing units 16.

In the third preferred embodiment, since the fixed electrodes 12 are arranged on the substrate 2, a DC voltage applied between the movable element 6 and the fixed electrodes 12 causes the movable element 6 to be attracted towards the substrate 2. When no DC voltage is applied between the movable element 6 and the fixed electrodes 12, a space is generated between the insulating film 11 on the movable electrode 10 and the coplanar line 3, as shown in FIG. 7.

In the third preferred embodiment, the upper member 4 is omitted, thus simplifying the structure and manufacturing process of the RF-MEMS device 1.

Although the upper member 4 is omitted in the third preferred embodiment, even if the fixed electrodes 12 are arranged on the substrate 2 as in the third preferred embodiment, the upper member 4 may be arranged as in the first and second preferred embodiments for protecting the movable element 6.

A fourth preferred embodiment of the present invention will now be described. In the description of the fourth preferred embodiment, the same elements as in the first, second, and third preferred embodiments are referred to with the same reference numerals and the descriptions of those same elements will not be repeated here.

Figure 8A:
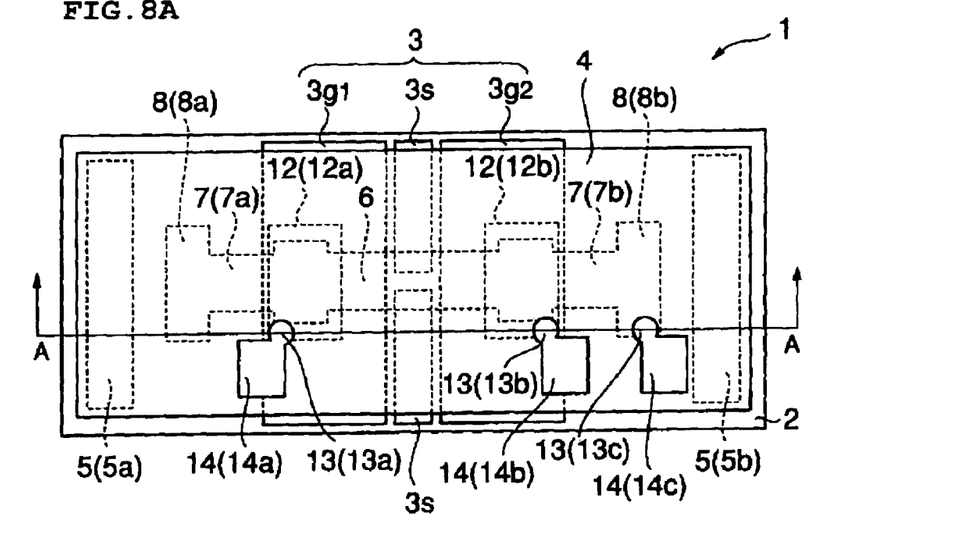
FIG. 8A is a schematic plan view showing an RF-MEMS device according to a fourth preferred embodiment of the present invention.
Figure 8B:
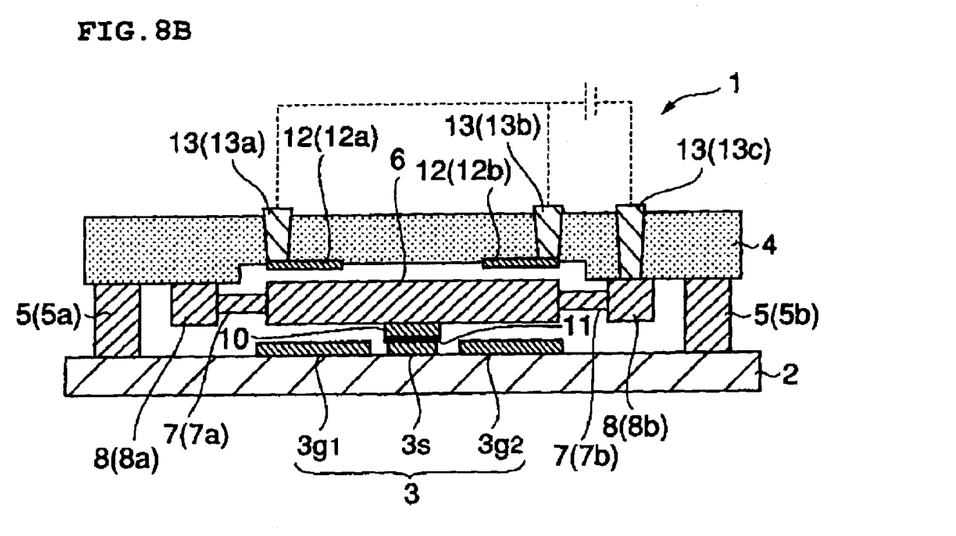
FIG. 8B is a schematic sectional view showing the RF-MEMS device taken along line AA in FIG. 8A.

FIG. 8A is a schematic plan view showing the RF-MEMS device 1 according to the fourth preferred embodiment. FIG. 8B is a schematic sectional view showing the RF-MEMS device 1 taken along line A—A in FIG. 8A.

Although the RF-MEMS device 1 according to each of the first, second, and third preferred embodiments functions as a so-called parallel switch, the RF-MEMS device 1 according to the fourth preferred embodiment functions as a series switch.

More specifically, in the fourth preferred embodiment, the signal line 3s of the coplanar line 3 has an intermediate gap 18, and the movable electrode 10 is arranged on the movable element 6 to face an area from one end of one divided line at one side of the intermediate gap 18 to one end of the other divided line at the other side of the intermediate gap 18, with the intermediate gap 18 therebetween. In the fourth preferred embodiment, the movable electrode 10 does not face the ground line 3g1 and the ground line 3g2 of the coplanar line 3.

The RF-MEMS device 1 according to the fourth preferred embodiment preferably has the same arrangement as in the first, second, and third preferred embodiments with the exception of the arrangement of the signal line 3s of the coplanar line 3 and the movable electrode 10. Although, as shown in FIGS. 8A and 8B, the movable element 6 is connectable with an outside circuit via the through hole 13c and the electrode pad 14c as in the first preferred embodiment, the movable element 6 may be electrically floating, as in the second preferred embodiment. Although, as shown in FIGS. 8A and 8B, the fixed electrodes 12 are arranged on the upper member 4 in the fourth preferred embodiment, the fixed electrodes 12 may be arranged on the substrate 2, as in the third preferred embodiment.

In the RF-MEMS device 1 according to the fourth preferred embodiment, as shown in FIG. 8B, if the insulating film 11 on the movable electrode 10 is in contact with the signal line 3s and the space between the movable electrode 10 and the one end of each of the divided lines at both sides of the intermediate gap 18 is thus very small, the capacitance between the movable electrode 10 and the one end of each of the divided lines at both sides of the intermediate gap 18 increases, and an RF short circuit thereby occurs between the movable electrode 10 and the one end of each of the divided lines at both sides of the intermediate gap 18. Accordingly, the movable electrode 10 connects the one end of each of the divided lines at both sides of the intermediate gap 18 and the signal conduction in the signal line 3s is thus switched on.

If the displacement of the movable element 6 by the movable element displacing unit causes the movable electrode 10 to be displaced away from the substrate 2, the space between the movable electrode 10 and the one end of each of the divided lines at both sides of the intermediate gap 18 becomes larger, thus reducing the capacitance between the movable electrode 10 and the one end of each of the divided lines at both sides of the intermediate gap 18. Accordingly, an open circuit occurs between the movable electrode 10 and the one end of each of the divided lines at both sides of the intermediate gap 18 and the signal conduction in the signal line 3s is thus switched off.

In the fourth preferred embodiment, the movable element 6 is also preferably made of a high-resistivity semiconductor, as in the first to third preferred embodiments, thus realizing advantages similar to those in the first to third preferred embodiments.

The present invention is not limited to any of the first, second, third, and fourth preferred embodiments and various modifications may be applied thereto. For example, although the RF-MEMS device 1 is a switching device in the first to fourth preferred embodiments, the RF-MEMS device 1 may be a variable capacitor having a similar structure. For the switching device, the movable element 6 must be significantly displaced so that the state between the movable electrode 10 and the coplanar line 3 can be switched between the RF short circuit and the open circuit. For the variable capacitor, however, the range of variation in the capacitance is generally not so large. Thus, it is unnecessary for the movable element 6 to be greatly displaced. If the RF-MEMS device 1 is a variable capacitor, the elastic modulus of the beams 7 and the like should preferably be set so that high-precision control for displacement of the movable element 6 can be realized.

Although a coplanar line is preferably provided as an RF signal-conducting unit in the first to fourth preferred embodiments, a microstrip line, for example, may be provided as the RF signal-conducting unit.

Although high-resistivity silicon is preferably used as the high-resistivity semiconductor functioning as the movable element 6 in each preferred embodiment described above, the movable element 6 may be composed of a high-resistivity semiconductor made, for example, of gallium arsenide (GaAs).

Although the insulating film 11 is arranged on the movable electrode 10 in the first to fourth preferred embodiments, the insulating film 11 may be arranged, for example, on a portion of the coplanar line 3 that faces at least the movable electrode 10 or may be arranged on a surface of the movable electrode 10 and a surface of the coplanar line 3, which face each other.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An RF-MEMS device comprising:
   a substrate;
   an RF signal-conducting unit arranged on the substrate;
   a movable element arranged above the substrate with a space therebetween and facing at least a portion of the RF signal-conducting unit with a space therebetween;
   a movable electrode arranged on the movable element and facing at least a portion of the RF signal-conducting unit; and
   a fixed electrode arranged on the substrate and facing at least a portion of the movable element; wherein
   the movable element includes a high-resistivity semiconductor defining as an insulator for an RF signal and defining as an electrode for a low-frequency signal and a DC signal, the fixed electrode and the movable element are arranged to function together and define a movable element displacing unit for displacing the movable element towards the fixed electrode by electrostatic attraction caused by a DC voltage applied between the fixed electrode and the movable element, the movable element displacing unit displaces the movable element towards or away from the substrate by the electrostatic attraction, and the displacement of the movable element caused by the movable element displacing unit changes the space between the RF signal-conducting unit and the movable electrode so as to vary the capacitance between the RF signal-conducting unit and the movable electrode.

2. An RF-MEMS device according to claim 1, further comprising a protective insulating film provided on at least one of a surface of the RF signal-conducting unit and a surface of the movable electrode, the surface of the RF signal-conducting unit being disposed opposite to said surface of the movable electrode.

3. An RF-MEMS device according to claim 1, wherein an RF signal with a frequency of at least about 5 GHz flows in the RF signal-conducting unit.

4. An RF-MEMS device according to claim 1, wherein the high-resistivity semiconductor of the movable element has a resistance ranging from about 1,000 Ωcm to about 10,000 Ωcm.

5. An RF-MEMS device according to claim 1, wherein the RF-MEMS device is a variable capacitor defined by the RF signal-conducting unit and the movable electrode and the capacitance of the variable capacitor varies with the displacement of the movable element.

6. An RF-MEMS device according to claim 1, wherein the RF signal-conducting unit is a coplanar line, and wherein the RF-MEMS device is a switching device in which an increased capacitance between the coplanar line and the movable electrode causes an RF short circuit between the coplanar line and the movable electrode so as to switch off the conduction of the coplanar line, and in which a decreased capacitance between the coplanar line and the movable electrode causes an RF-open circuit between the coplanar line and the movable electrode so as to switch on the conduction of the coplanar line.

7. An RF-MEMS device according to claim 1, wherein the RF signal-conducting unit includes divided signal lines which are divided by an intermediate gap provided in an area that faces the movable electrode, and one end of each of the divided signal lines at each side of the intermediate gap faces the movable electrode with a space therebetween.

8. An RF-MEMS device according to claim 7, wherein the RF-MEMS device is a switching device in which an increased capacitance between the movable electrode and the one end of each of the divided signal lines at each side of the intermediate gap causes an RF short circuit between the movable electrode and the one end of each of the divided signal lines at each side of the intermediate gap so as to switch on the conduction of the one end of each of the divided signal lines at each side of the intermediate gap by the movable electrode.

9. An RF-MEMS device according to claim 8, wherein a decreased capacitance between the movable electrode and the one end of each of the divided signal lines at each side of the intermediate gap causes an open circuit between the movable electrode and the one end of each of the signal lines at each side of the intermediate gap so as to switch off the conduction of the signal in the divided signal lines.

10. An RF-MEMS device according to claim 1, wherein the RF-MEMS device is one of a switching device and a variable capacitor.

11. An RF-MEMS device comprising:

a substrate;

an RF signal-conducting unit arranged on the substrate;

a movable element arranged above the substrate with a space therebetween and facing at least a portion of the RF signal-conducting unit with a space therebetween;

a movable electrode arranged on the movable element and facing at least a portion of the RF signal-conducting unit;

an upper member facing at least a portion of a top surface of the movable element with a space therebetween; and a fixed electrode arranged on the upper member so as to face at least a portion of the movable element; wherein the movable element includes a high-resistivity semiconductor defining an insulator for an RF signal and defining an electrode for a low-frequency signal and a DC signal, the fixed electrode and the movable element are arranged to function together and define a movable element displacing unit for displacing the movable element towards the fixed electrode by electrostatic attraction caused by a DC voltage applied between the fixed electrode and the movable element, the movable element displacing unit displaces the movable element towards or away from the substrate by the electrostatic attraction, and the displacement of the movable element caused by the movable element displacing unit changes the space between the RF signal-conducting unit and the movable electrode so as to vary the capacitance between the RF signal-conducting unit and the movable electrode.

12. An RF-MEMS device according to claim 11, further comprising a protective insulating film provided on at least one of a surface of the RF signal-conducting unit and a surface of the movable electrode, the surface of the RF signal-conducting unit being disposed opposite to said surface of the movable electrode.

13. An RF-MEMS device according to claim 11, wherein an RF signal with a frequency of at least about 5 GHz flows in the RF signal-conducting unit.

14. An RF-MEMS device according to claim 11, wherein the high-resistivity semiconductor of the movable element has a resistance ranging from about 1,000 Ωcm to about 10,000 Ωcm.

15. An RF-MEMS device according to claim 11, wherein the RF-MEMS device is a variable capacitor defined by the RF signal-conducting unit and the movable electrode and the capacitance of the variable capacitor varies with the displacement of the movable element.

16. An RF-MEMS device according to claim 11, wherein the RF signal-conducting unit is a coplanar line, and wherein the RF-MEMS device is a switching device in which an increased capacitance between the coplanar line and the movable electrode causes an RF short circuit between the coplanar line and the movable electrode so as to switch off the conduction of the coplanar line, and in which a decreased capacitance between the coplanar line and the movable electrode causes an RF-open circuit between the coplanar line and the movable electrode so as to switch on the conduction of the coplanar line.

17. An RF-MEMS device according to claim 11, wherein the RF signal-conducting unit includes divided signal lines which are divided by an intermediate gap provided in an area that faces the movable electrode, and one end of each of the divided signal lines at each side of the intermediate gap faces the movable electrode with a space therebetween.

18. An RF-MEMS device according to claim 17, wherein the RF-MEMS device is a switching device in which an increased capacitance between the movable electrode and the one end of each of the divided signal lines at each side of the intermediate gap causes an RF short circuit between the movable electrode and the one end of each of the divided signal lines at each side of the intermediate gap so as to switch on the conduction of the one end of each of the divided signal lines at each side of the intermediate gap by the movable electrode.

19. An RF-MEMS device according to claim 18, wherein a decreased capacitance between the movable electrode and the one end of each of the divided signal lines at each side of the intermediate gap causes an open circuit between the movable electrode and the one end of each of the signal lines at each side of the intermediate gap so as to switch off the conduction of the signal in the divided signal lines.

20. An RF-MEMS device according to claim 11, wherein the RF-MEMS device is one of a switching device and a variable capacitor.

* * * * *